US008311655B2

(12) United States Patent
Ban

(10) Patent No.: US 8,311,655 B2
(45) Date of Patent: Nov. 13, 2012

(54) APPARATUS FOR PREPARING A PLAYLIST IN A SOUND SOURCE DATA PLAYER AND A METHOD THEREFOR

(75) Inventor: Ji-Hye Ban, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1353 days.

(21) Appl. No.: 11/737,268

(22) Filed: Apr. 19, 2007

(65) Prior Publication Data

US 2008/0028917 A1 Feb. 7, 2008

(30) Foreign Application Priority Data

Aug. 1, 2006 (KR) ........................ 10-2006-0072526

(51) Int. Cl.
*G06F 17/00* (2006.01)
*G06F 7/00* (2006.01)
*G06F 17/30* (2006.01)

(52) U.S. Cl. ........................... 700/94; 707/752; 707/756

(58) Field of Classification Search .................... 700/94; 707/752, 756

See application file for complete search history.

(56) References Cited

U.S. PATENT DOCUMENTS

| | | | | | |
|---|---|---|---|---|---|
| 5,216,644 | A * | 6/1993 | Shiba et al. | 369/30.28 |
| 5,919,047 | A * | 7/1999 | Sone | 434/307 A |
| 6,546,456 | B1 * | 4/2003 | Smith et al. | 711/112 |
| 7,701,811 | B2 * | 4/2010 | Fujisawa | 369/30.05 |
| 2001/0037430 | A1 * | 11/2001 | Heo | 711/112 |
| 2002/0118300 | A1 * | 8/2002 | Middleton et al. | 348/569 |
| 2005/0241465 | A1 * | 11/2005 | Goto | 84/616 |
| 2009/0228123 | A1 * | 9/2009 | Fontijn | 700/94 |

FOREIGN PATENT DOCUMENTS

| | | | |
|---|---|---|---|
| KR | 10-2001-0046233 | A | 6/2001 |
| KR | 10-2002-0010064 | A | 2/2002 |
| KR | 10-2003-0008730 | A | 1/2003 |
| KR | 20-0385199 | Y1 | 5/2005 |

* cited by examiner

*Primary Examiner* — Davetta W Goins
*Assistant Examiner* — Daniel Sellers
(74) *Attorney, Agent, or Firm* — Jefferson IP Law, LLP

(57) ABSTRACT

An apparatus and method for preparing a playlist in a sound source data player are provided. For the preparation of the playlist, the position of a sampling of the sound source data is set by user's arbitrary selection or by searching out the thematic part of the sound source data. Then, if the sampling time taken for playing back the sampling has been set, the player plays back the sound source data file selected by moving a cursor from the position of the sampling. Finally, the user adds the individual information of the presently selected sound source data to the playlist. Thus, the user may quickly and readily sample a large number of songs stored in the player and thus more easily prepare the playlist.

15 Claims, 6 Drawing Sheets

APPARATUS FOR PREPARING A PLAYLIST IN A SOUND SOURCE DATA PLAYER AND A METHOD THEREFOR

PRIORITY

This application claims the benefit under 35 U.S.C. §119 (a) of a Korean patent application filed in the Korean Intellectual Property Office on Aug. 1, 2006 and assigned Serial No. 2006-72526, the entire disclosure of which is hereby incorporated by reference.

BACKGROUND OF THE INVENTION

1. Field of the Invention

The present invention relates to a sound source data player for playing back sound source data. More particularly, the present invention relates to a method and apparatus for preparing a playlist of sound source data files selected by a user for playback in a sound source data player storing the sound source data files.

2. Description of the Related Art

Generally, a sound source data player is used to play back sound source data files that have been prepared in various formats, such as MPEG audio layer 3 (MP3) and WAV formats. Recent development of technologies has allowed for miniaturization of sound source data players even when the players are provided with a storage capacity to store several hundred songs.

The storage capacity of the player, which allows a user to store a large number of songs, makes it necessary for the user to prepare a playlist of selected sound source data files. To this end, a conventional player has been designed so as to generate a playlist of sound source data files edited by the user, which includes only the individual information of the selected sound source data files, so that the user may readily play the selected songs by means of the playlist. The method of preparing the playlist is to repeatedly select desired songs from the list of all the sound source data files stored in the player, thus adding the selected songs to the playlist.

This method may be practically applied when a small number of songs are stored in the player considering the need for a user to memorize their melodies. However, if the number of songs stored in the player exceeds several hundred, it is practically impossible for the user to prepare a playlist by memorizing the melodies of all the songs stored in the player. Hence, in order to prepare a playlist of the desired songs, the user must check each one of the several hundred songs through playback, consuming a significant amount of time.

Various methods have been proposed to resolve the above problem. For example, a method of using a voice recognition device to enable the user to search sound source data by a voice command has been proposed. However, this proposal requires the additional expense of voice recognition devices and does not guarantee the precise detection of the desired sound source data. Another method has been proposed that allows a user to hum a melody which the player uses to search out the sound source data matching it. However, this proposal requires an analog-to-digital (A/D) converter for converting the hummed melody into a corresponding digital signal, together with comparing it with the several hundred songs stored in the player. In all, a satisfactory method for readily preparing a desired playlist is not available.

SUMMARY OF THE INVENTION

Accordingly, the present invention has been made to address the above-mentioned problems and/or disadvantages, and an object of the present invention is to provide a sound source data player with a means for enabling a user to readily prepare a playlist of desired sound source data by a method facilitating their detection.

Another object of the present invention is to provide a sound source data player with a means for enabling the user to prepare a playlist of desired sound source data files by listening to a sample of the sound source data files.

According to an aspect of the present invention, an apparatus for preparing a playlist in a sound source data player is provided. The apparatus includes a key input unit having at least one key, a memory unit for storing a plurality of sound source data files, for storing the playlist representing the individual information of each of the sound source data files selected by the user, and for storing the position of a sampling of each of the sound source data file together with a sampling time taken for the playback of the sampling, a timer for determining the end of the sampling time and a control unit for setting the position of the sampling as a playback start position of a sound source data file selected by moving a cursor during preparation of the playlist, playing back the selected sound source data from the playback start position for the sampling time, and adding the individual information of the selected sound source data to the playlist according to the user's selection.

According to another aspect of the present invention, a method for preparing a playlist in a sound source data player is provided. The method includes setting a position of a sampling of sound source data if a position of a sampling of the sound source data is not detected, setting a sampling time taken for the playback of the sampling if a sampling time is not detected, enabling the user to select a particular sound source data file, determining the playback start position of the particular sound source data corresponding to the position of the sampling from the playback time of the sound source data, performing a playback from the playback start position for the sampling time and enabling the user to add the selected sound source data to the playlist.

BRIEF DESCRIPTION OF THE DRAWINGS

The above and other objects, aspects, features and advantages of certain exemplary embodiments of the present invention will become more apparent from the following detailed description taken in conjunction with the accompanying drawing in which.

Throughout the drawings, like reference numerals will be understood to refer to like parts, components and structures.

DETAILED DESCRIPTION OF EXEMPLARY EMBODIMENTS

The following description, with reference to the accompanying drawings, is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions or constructions are omitted for clarity and conciseness.

To aid in an understanding of the present invention, a basic principle thereof will first be explained. In an exemplary embodiment of the present invention, a user prepares a playlist by setting a position of a sampling of each sound source data file according to the user's arbitrary selection or according to a certain method of detecting a thematic part of the sound source data. A position of a sampling of a sound source data file represents a location within the sound source data file at which playback of a sampling of the sound source data file starts. In an exemplary embodiment of the present invention, it is also determined if a sampling time taken for playback of the sampling has been set. A sampling time represents a duration or time period for which the sampling is played back, that is, a length of the sampling. If a sampling time has been set, the position of the sampling is set as the playback start position of a sound source data file selected by moving a cursor, so that the selected sound source data file is played back from the playback start position for the set sampling time. Subsequently, the user may add the individual information of the presently selected sound source data file to the playlist. Thus, the user may prepare a playlist by readily and easily checking the melodies of a plurality of the sound source data files stored in the player.

Figure 1:
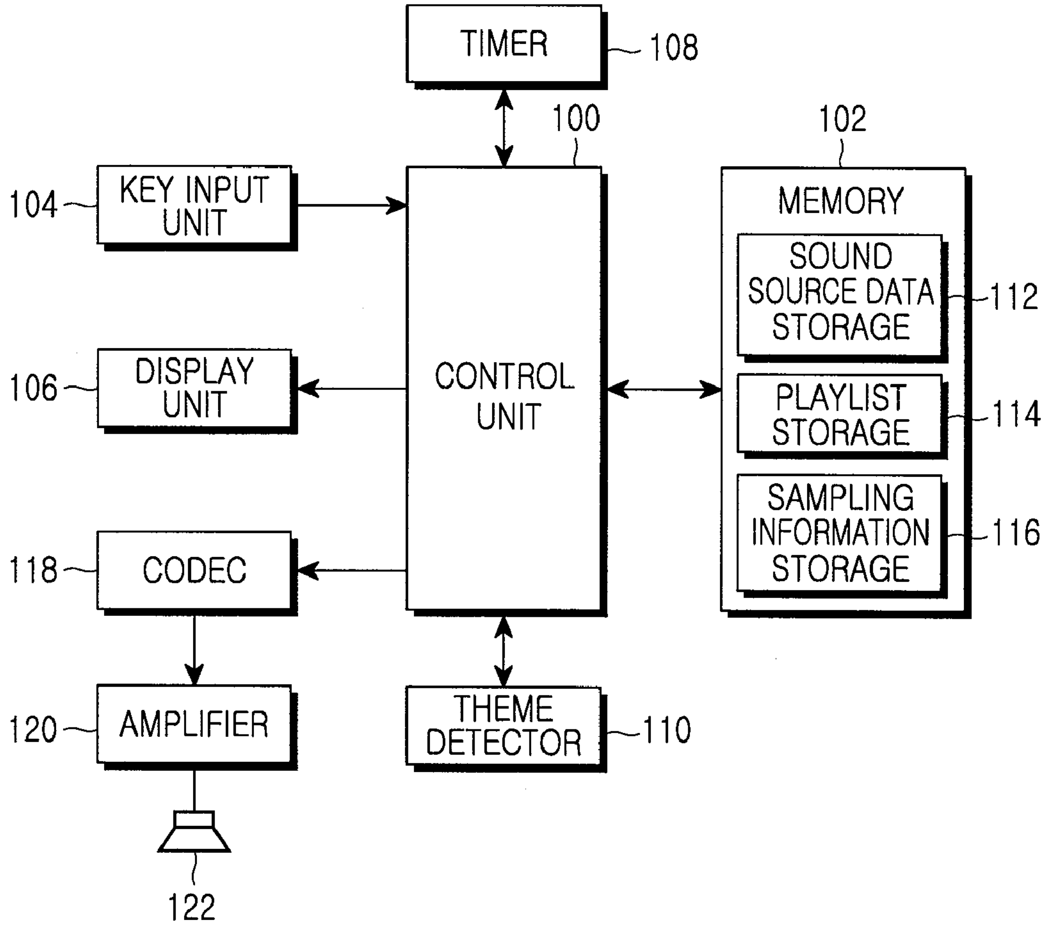
FIG. 1 is a block diagram for illustrating a structure of a sound source data player according to an exemplary embodiment of the present invention.

Referring to FIG. 1, an exemplary sound source data player may include a control unit 100, a memory unit 102 connected to the control unit 100, a key input unit 104, a display unit 106, a codec (coder-decoder) 118, a timer 108, and a theme detector 110. The control unit 100 selects one of the sound source data files stored in the memory unit 102 to be played back through a speaker 122 according to a protocol for the playback of the sound source data, controlling each part of the player. The control unit also controls the display unit 106 to display a menu, a presently prepared playlist, and the additional information of the sound source data file presently played back in response to the user's key input.

In an exemplary embodiment, the control unit 100 sets a playback start position of a sound source data file arbitrarily, as selected by a user, as the position of the sampling. In another exemplary embodiment, the control unit 100 detects a thematic part of each sound source data file, using the theme detector 110, and sets the playback start position to correspond to the detected thematic part of each sound source data file as the position of the sampling. The control unit 100 also plays back the sound source data file from the playback start position corresponding to the position of the sampling for a sampling time.

The memory unit 102 connected to the control unit 100 may include a Read Only Memory (ROM), flash memory, Random Access Memory (RAM), and the like. The ROM may be used to store programs used for the control and process of the control unit 100 and various reference data. The RAM may serve as the working memory of the control unit 100 and the flash memory may serve as the storage region for storing various revisable reserved data.

The flash memory may include a sound source data file storage 112 for storing several hundred songs, a playlist storage 114 for storing the playlist of the sound source data selected by the user, and a sampling information storage 116 for storing the sampling time set by the user and the position of the sampling selected by the user or determined by automatically analyzing the sound source data.

The key input unit 104 may include various keys to enable a user to enter input data into the control unit 100. The display unit 106 may be controlled by the control unit 100 to display information of the sound source data presently stored in the sound source data storage. The display unit may also be controlled by the control unit 100 to display the information of the sound source data file selected by the user including the information of the playback time, title and artist as well as the information of the sampling time and the position of the sampling. The codec 118 decodes the sound source data received from the control unit 100 into the corresponding analog signals applied through an amplifier 120 to a speaker 122. The timer 108, driven and initialized by the control unit 100, may be used to determine if the sampling time has elapsed. The theme detector 110 detects a position of thematic parts of the sound source data files. In an exemplary embodiment, the theme detector 110 detects the thematic parts by means of an algorithm for searching out a repeated pattern of the sound source data such as refrain under the control of the control unit 100.

Figure 2:
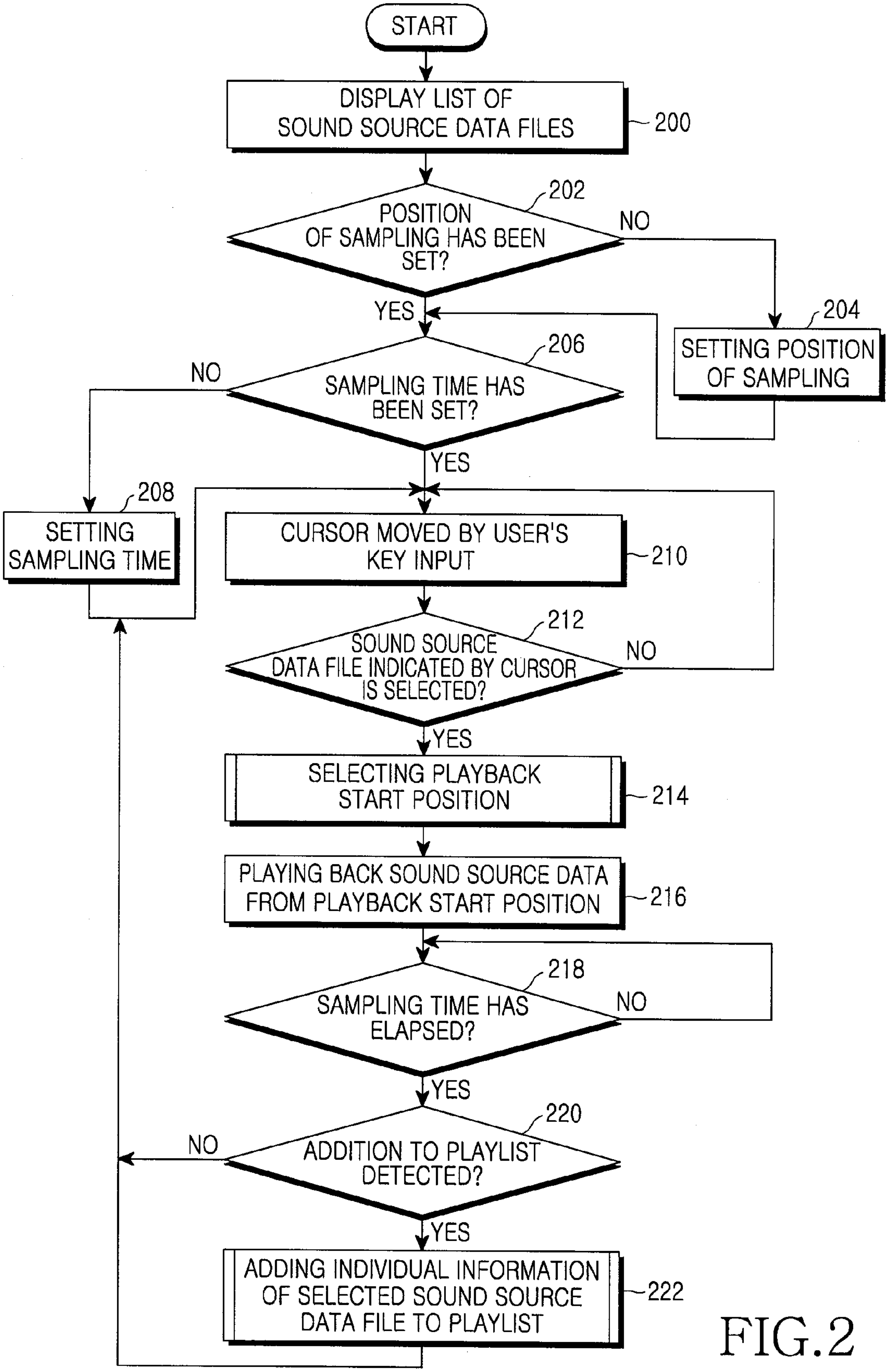
FIG. 2 is a flowchart for illustrating a process of preparing a playlist according to a user's selection in a sound source data player according to an exemplary embodiment of the present invention.

Referring to FIG. 2 for illustrating an exemplary process of preparing a playlist, if the user selects the preparation of the playlist, the sound source data player proceeds to step 200 to display a list of the sound source data files stored in the sound source data storage 112 in the display unit 106. Then, the control unit 100 proceeds to step 202 to determine if the position of a sampling of the sound source data files has been set. In an exemplary embodiment, the position of the sampling may be set by various methods such as directly setting a particular time (for example, 90 seconds from the start) or based on a relative ratio between a played and not played part (for example, 85% to 15%) of the total playback time. Hereinafter, a description is made in connection with a relative ratio since the playback time is different for each of the sound source data.

If a set position of the sampling is detected in step 202, the control unit proceeds to step 206 to determine if the sampling time has been set. However, if the set position of the sampling is not detected in step 202, the control unit proceeds to step 204 to perform the process of setting the position of the sampling, and then proceeds to step 206.

Step 204 may be performed by various methods. In an exemplary embodiment, a user may arbitrarily set the position of the sampling (for example, setting the position at 75% of the total playback time for each of the sound source data files). In another exemplary embodiment, the control unit may automatically set the position of the sampling by searching out a thematic part of the sound source data. In automatically setting the position of the sampling, the position of the sampling may be set differently for each of the sound source data files according to the positions of their respective thematic parts. In another exemplary automatic method, the position of the sampling for each sound source data file may be set corresponding to a relative ratio based on a representative value obtained by analyzing the positions of the thematic parts of all sound source data files searched out. Alternatively, whenever the user selects a sound source data file, the position of the sampling may be set by detecting the thematic part thereof. The position of the sampling is stored in the sampling information storage 116. The process of setting the position of the sampling in step 204 will be more specifically described with reference to FIG. 3.

Proceeding through steps 202 and 204 to step 206, the control unit 100 determines if the sampling time has been set. If the sampling time has been set, the control unit 100 proceeds to step 210 to enable the user to move a cursor by key input so as to select a sound source data file in step 212. However, if the sampling time has not been set as detected in step 206, the control unit proceeds to step 208 to enable the user to set the sampling time by displaying a menu. In an exemplary embodiment, the user may set the time at increments of one second. The sampling time is stored in the sampling information storage 116.

Subsequently, when the user selects the sound source data file indicated by the cursor in step 212, the control unit proceeds to step 214 to select the playback start position of the sound source data file according to the set position of the sampling retrieved from the sampling information storage 116. Then the control unit proceeds to step 216 to play back the sound source data from the playback start position. For example, if the position of the sampling is 85%, the control unit 100 sets the playback start position at 85% of the total playback length in step 214, and the playback is started from the start position in step 216. Then, the control unit 100 proceeds to step 218 to determine if the set sampling time has elapsed. If not detecting the end of the sampling time, the control unit 100 continues playing back the sound source data. However, if the end of the sampling time is detected, the control unit 100 stops the playback operation.

Consequently, the control unit proceeds to step 220 to determine if the user adds the presently selected sound source data file to the playlist. If not detecting the addition to the playlist, the control unit returns to step 210 to repeat steps 210 to 220, which comprise selection of a sound source data file, its playback, and detecting the addition to the playlist. However, if detecting the addition to the playlist, the control unit 100 proceeds to step 222 to add to the playlist the individual information of the presently selected sound source data file including the title, total playback time, and address thereof stored in the memory unit 102, which identifies the selected sound source data file. Then the control unit 100 returns to step 210 to repeat the steps 210 to 220. In addition, if a user enters a certain number in step 222, the number is registered in the playlist as representing the selected sound source data file. The step 222 will be more specifically described in connection with FIG. 6.

Thus, exemplary embodiments of the invention enable a user to readily and quickly prepare a playlist of desired sound source data files by playing back the sound source data file from a particular sampling position only for a set sampling time, considerably reducing the time for searching out the desired ones among a large number of sound source data files stored in the player.

Figure 3:
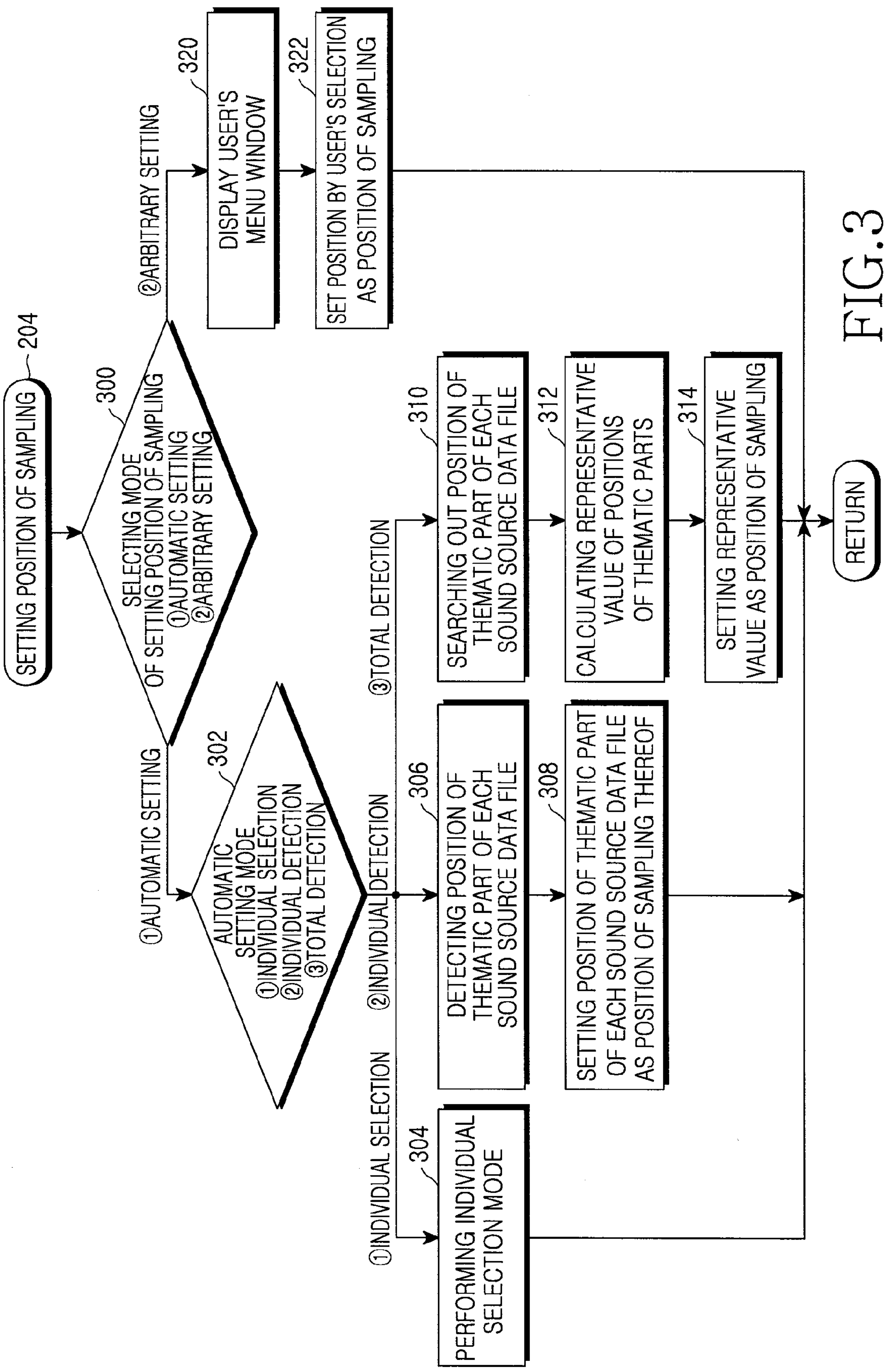
FIG. 3 is a flowchart for illustrating a process of setting the position of a sampling in a sound source data player according to an exemplary embodiment of the present invention.

Referring to FIG. 3 which illustrates an exemplary process of setting a position of the sampling, if not detecting the position of the sampling in step 202, the control unit 100 proceeds to steps 204 and 300 to enable the user to select a method of setting the position of the sampling. Hereinafter, the position of the sampling is described in two exemplary methods, one of which is to automatically set the position of the sampling by means of software for searching out the thematic part of a sound source data, and the other to enable the user to arbitrarily set a particular position of a sound source data as the position of the sampling. Further, in an exemplary embodiment of the automatic setting, the user may select one of two ways, one of which is to set the thematic part of each of the sound source data as the position of the sampling for each sound source data, and the other of which is to set a representative value obtained by analyzing the positions of the thematic parts of all the sound source data as the position of the sampling for all. Of course, it will be noted that various modifications to the methods may be made without departing from the spirit and scope of the invention.

In step 300, the control unit 100 determines whether the user has selected the automatic setting or the arbitrary setting. If the user has selected the automatic setting, the control unit 100 proceeds to step 302 to determine whether it is the individual selection mode, the individual detection mode or the total detection mode. The individual selection mode enables the control unit to set the position of the thematic part of a sound source data file as the position of the sampling only when the sound source data file has been selected by the user.

If the user selects the individual selection mode in step 302, the control unit 100 proceeds to step 304 to perform the individual selection mode. Then, it returns to step 206 to determine if the sampling time has been set, repeating steps 206 to 210. In this case, if the user selects a particular sound source data file in step 212, the control unit 100 proceeds to step 214 to detect the position of the thematic part of the selected sound source data file set as the position of the sampling in the individual selection mode. The description of step 214 will be made more specifically in connection with FIG. 5.

Alternatively, if the user selects the individual detection mode in step 302, the control unit 100 proceeds to step 306 to detect the position of the thematic part of each of the sound source data files, which is set in step 308 as the position of the sampling for each sound source data file, respectively. Then, it returns to step 206 to determine if the sampling time has been set, repeating steps 206 to 210.

Alternatively, if the user selects the total detection mode in step 302, the control unit 100 proceeds to step 310 to search out the position of the thematic part of each of the total sound source data files stored in the sound source data storage 112. Then, it proceeds to step 312 to calculate a representative value of the positions of the thematic parts searched out. In an exemplary embodiment, the representative value may be the mean value of the positions of the thematic parts, or the position where most of the thematic parts belong with respect to the length of the set. For example, if the set sampling time is 5%, and the positions of the thematic parts belong to 80 to 85% of the total playback time, the representative value may set the position as 80%. Subsequently, if the representative value is set in step 312, the control unit 100 proceeds to step 314 to set the representative value as the position of the sampling. Hence, because of the total detection mode selected in step 302, the position of the sampling is determined by the single representative value commonly applied to all the sound source data presently stored.

Figure 4A:
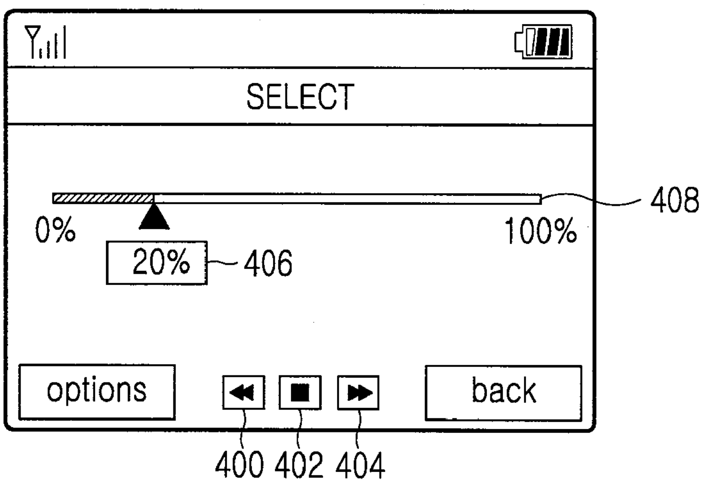
FIGS. 4A to 4C are examples of a display screen for enabling a user to arbitrarily select a position of a sampling in a sound source data player according to an exemplary embodiment of the present invention.
Figure 4B:
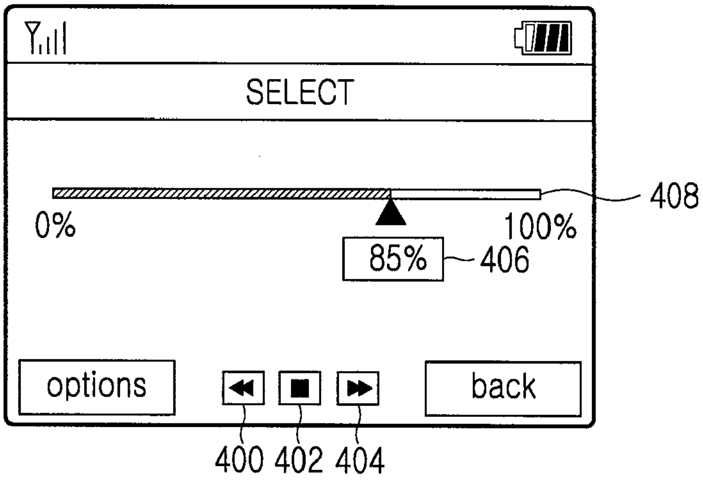
Figure 4C:
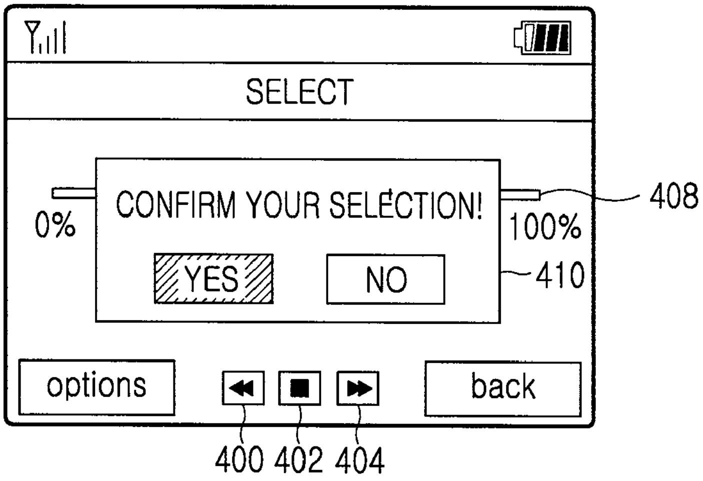

If the arbitrary setting is selected in step 300, the control unit 100 proceeds to step 320 to display a user's menu window for enabling the user to directly set the position of the sampling of the sound source data files, which is illustrated in FIGS. 4A to 4C. Referring to FIG. 4A, the user's menu window includes at least directional keys 400 and 404 for enabling the user to directly displace the position of the sampling, a selection key 402 for selecting the position of the sampling, a position value window 406 for displaying the position of the sampling, and an indication gauge 408 for indicating the total playback time or length of the sound source data file. Thus, if the user's menu window is displayed in step 320, and the user enters a key input through one of the directional keys 400 and 404, the position value window 406 and the indication gauge 408 display the displaced position of the sampling. For example, referring to FIGS. 4A and 4B, if the user continues pressing the right key 404 from the state of FIG. 4A, the position value window 406 also continues moving to the right, displaying the present position of the sampling.

Thereafter, if the user selects the position of the sampling, the control unit 100 proceeds to step 322 to set the selected position as the position of the sampling. For example, as illustrated in FIG. 4B, if the user selects the sampling position at 85% through the selection key 402, the control unit 100 displays confirmation window 410 for confirming the user's selection so as to set the selected position as the position of the sampling, as illustrated in FIG. 4C. In an exemplary embodiment, the position of the sampling may be stored to have a single value commonly applied to all of the presently stored sound source data. Subsequently, the control unit 100 proceeds to step 206 to determine if the sampling time has been set, repeating steps 206 to 210. Thus, exemplary embodiments of the invention enable a user to select one of an arbitrary setting mode and an automatic setting mode and further allow selection of total detection mode, individual detection mode, and individual selection mode while in the automatic setting mode for setting the position of the sampling.

Figure 5:
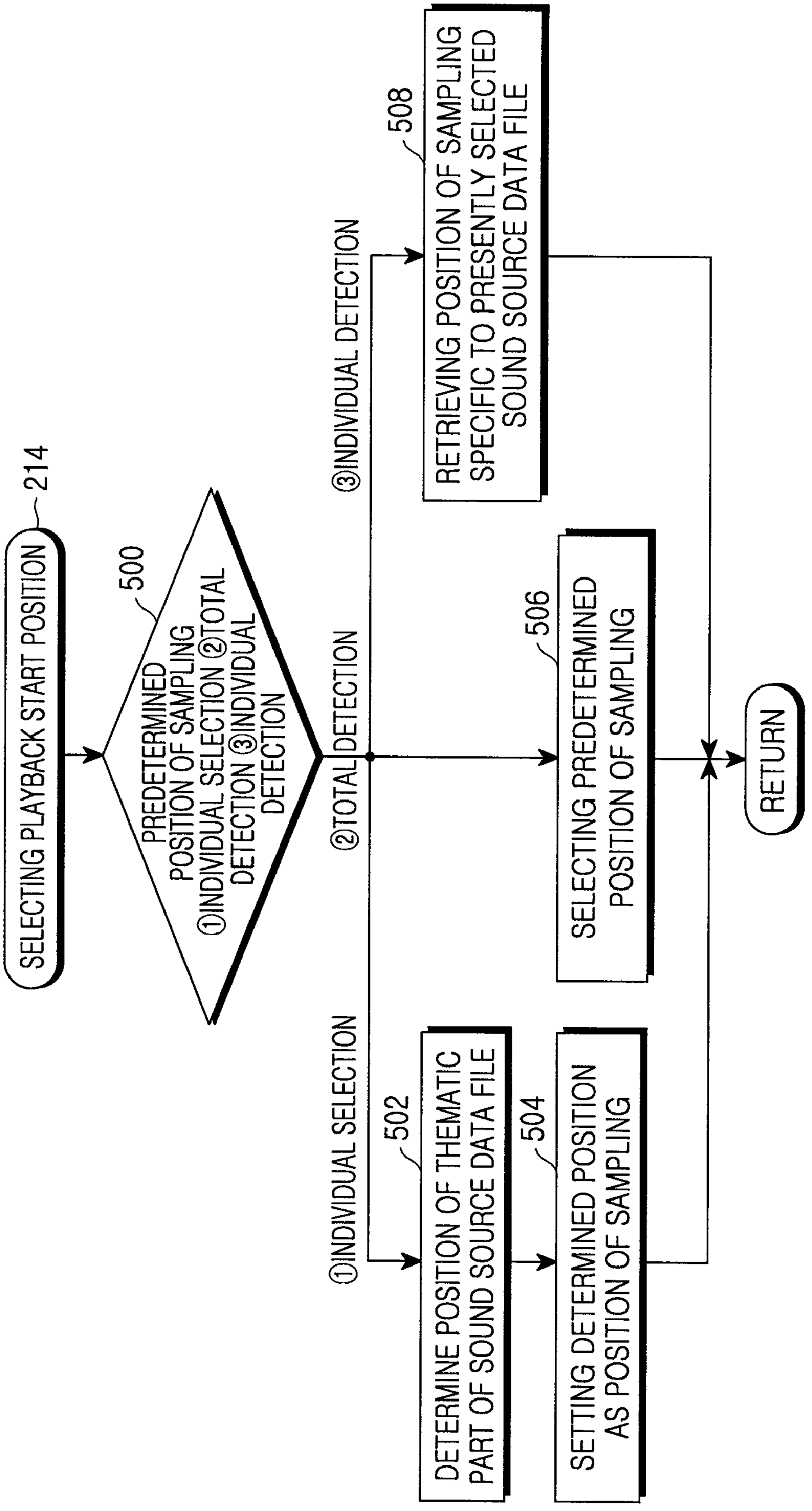
FIG. 5 is a flowchart for illustrating a process of playing back a part of a selected sound source data file according to a certain position of a sampling in a sound source data player according to an exemplary embodiment of the present invention.

FIG. 5 illustrates an exemplary process of playing back a part of the presently selected sound source data file according to the position of the sampling as has been defined by the individual selection mode, individual detection mode or total detection mode. Referring to FIG. 5, if a sound source data file is selected as indicated by the cursor in step 212, the control unit 100 proceeds to step 214 and step 500 to determine by which mode the position of the sampling has been defined. If detecting the individual selection mode in step 500, the control unit 100 proceeds to step 502 to determine the position of the thematic part of the presently selected sound source data file to be set as the position of the sampling. Next the controller proceeds to step 504 to set the determined position as the position of sampling. Then, it returns to step 216 to play back the sound source data from the position of the sampling.

Alternatively, if detecting the total detection mode in step 500, the control unit 100 proceeds to step 506 to retrieve the position of the sampling from the sampling information storage 116. Then, it returns to step 216 to play back the sound source data file from the position of the sampling retrieved for the set sampling time.

Alternatively, if detecting the individual detection mode in step 500, which represents the position of the sampling individually set for each sound source data file, the control unit 100 proceeds to step 508 to retrieve the position of the sampling specific to the presently selected sound source data file so as to replace the previously set position. Then, it returns to step 216 to play back the sound source data file from the position of the sampling that replaced the previously set position.

Figure 6:
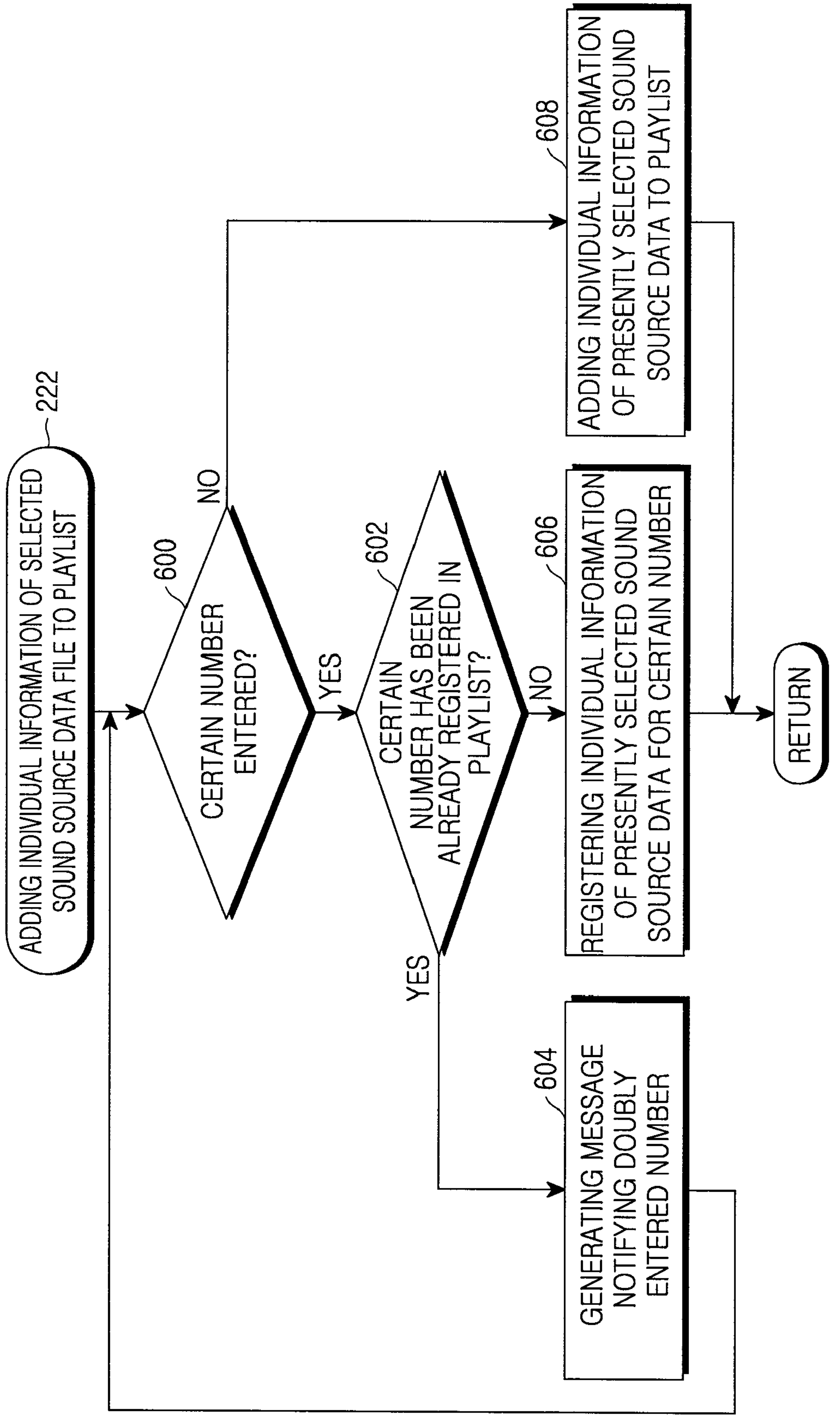
FIG. 6 is a flowchart for illustrating a process of adding individual information of a presently selected sound source data file in a sound source data player according to an exemplary embodiment of the present invention.

FIG. 6 illustrates an exemplary process of adding individual information of the presently selected sound source data files to the playlist. Referring to FIG. 6, if the user enters a certain number, the control unit may recognize it as a command to add the presently selected sound source data file to the playlist. In an exemplary embodiment, the certain number may be entered by means of a plurality of numeric keys provided in the player as in a mobile communication terminal with an MP3 playback function, or through a separate number entering mode enabling the user to use any operational key (for example, cursor moving key). In step 600, the control unit 100 determines if the user has entered a certain number. If not detecting a certain number in step 600, the control unit proceeds to step 608 to add the individual information of the presently selected sound source data file to the playlist. Then, it returns to step 210 to repeat the steps 210 to 220.

Alternatively, if detecting a certain number in step 600, the control unit 100 proceeds to step 602 to determine if the certain number has been already registered in the playlist for the individual information of another sound source data file. If detecting the certain number in the playlist, the control unit 100 proceeds to step 604 to generate a message notifying the user, then returns to step 600 to ask the user to enter another number. Of course, step 604 may further include the step of asking if the user will delete the individual information of the other sound source file so as to register the individual information of the presently selected sound source data file for the certain number.

Alternatively, if not detecting the certain number in the playlist, the control unit 100 proceeds to step 606 to register the individual information of the presently selected sound source data file for the certain number, then returns to step 210 to repeat the steps of 210 to 220. Thus, the invention enables the user to readily and quickly add the individual information of the presently selected sound source data file to the playlist for a certain number entered as well as to quickly search out desired sound source data.

While the invention has been illustrated and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for preparing a playlist in a sound source data player comprising:

a key input unit comprising at least one key;

a memory unit for storing a plurality of sound source data files, for storing a playlist representing individual information of at least one selected file from the plurality of sound source data files, and for storing a position of a sampling and a sampling time for each of said at least one selected file from said plurality of sound source data files;

a control unit for setting the position of said sampling as a playback start position of the at least one selected sound source data file, for playing back the at least one selected sound source data file from said playback start position for said sampling time, and for adding the individual information of the at least one selected sound source data file to said playlist according to the user's selection; and a theme detector for detecting a position of a thematic part of each of said plurality of sound source data files, wherein if the position of said sampling is not set, said control unit sets the position of said sampling by setting the sampling position as corresponding to the position of the thematic part detected by said theme detector, wherein the setting comprises setting a single representative value obtained by analyzing the positions, detected by the theme detector, of the thematic parts of said plurality of sound source data files, the single representative value comprising a default start position for sampling of all sound source data files of which the position is not set.

2. The apparatus as defined in claim 1, wherein said representative value comprises a mean value of the positions of the thematic parts of all of said plurality of sound source data files.

3. The apparatus as defined in claim 1, wherein if the user arbitrarily selects and enters an arbitrary number for the at least one selected sound source data file, said control unit associates the arbitrary number with the at least one selected sound source data file and adds individual information of the at least one selected sound source data file to said playlist as represented by said arbitrary number.

4. The apparatus as defined in claim 3, wherein if said arbitrary number is registered in said playlist as representing individual information of a sound source data file, said control unit displays an information window.

5. The apparatus as defined in claim 3, wherein if said arbitrary number is registered in said playlist as representing individual information of an other sound source data file, the control unit allows the user to delete the already registered individual information so as to register said arbitrary number for the individual information of the newly selected sound source data file.

6. The apparatus as defined in claim 1, wherein said representative value comprises a starting point of a sampling time, and wherein the control unit sets the representative value such that, when the plurality of sound source data files are each sampled starting at the default start position, resulting samplings comprise the thematic parts of a majority of said plurality of sound source data files.

7. A method for preparing a playlist in a sound source data player, the method comprising:

setting a position for a sampling of a sound source data file if a set position for said sampling of said sound source data file is not detected;

setting a sampling time for playback of said sampling if a set sampling time is not detected;

enabling a user to select a particular sound source data file;

determining a playback start position of said particular sound source data file corresponding to the position for said sampling of said sound source data file;

performing a playback from said playback start position for said sampling time; and enabling the user to add the selected sound source data file to a playlist, wherein the enabling of the user to add the selected sound source data file comprises:

detecting an arbitrary number arbitrarily selected and entered by the user; and registering said arbitrary number in said playlist as representing individual information of the selected sound source data file.

8. The method as defined in claim 7, wherein the enabling of the user to add the selected sound source data file further comprises:

determining whether said arbitrary number is already registered in said playlist as representing individual information of a different sound source data file; and displaying an information window if said arbitrary number is already registered in said playlist as representing the individual information of said different sound source data file.

9. The method as defined in claim 8, further comprising enabling the user to delete the already registered individual information so as to register said arbitrary number for the individual information of the newly selected sound source data file.

10. The method as defined in claim 7, wherein the setting for the position of said sampling comprises:

enabling the user to select an automatic setting method of setting the position for said sampling; and setting at least one position for said sampling according to the selected method of setting the position of said sampling.

11. The method as defined in claim 10, wherein the automatic setting method comprises a total detection mode for setting a representative value obtained by analyzing the positions of the thematic parts of all the stored sound source data files as the position of said sampling.

12. An apparatus for preparing a playlist in a sound source data player comprising:

a control unit for setting a playback start position for a sampling of a selected sound source data file, for setting a sampling time, for playing back the sampling of the selected sound source data file from said playback start position for the sampling time, and for adding individual information of the selected sound source data file to a playlist according to an arbitrary number arbitrarily selected and entered by a user; and a theme detector for detecting a thematic part of said sound source data files, wherein if the start position of said sampling is not previously set, then said control unit sets the start position of said sampling in accordance with a position of a thematic part detected by the theme detector.

13. The apparatus as defined in claim 12, wherein the setting of the start position as the position of the thematic part comprises setting a representative value obtained by analyzing a position of the thematic part of each of said plurality of sound source data files detected by said theme detector as the position of said sampling for each of said plurality of sound source data files.

14. The apparatus as defined in claim 13, wherein said representative value comprises a mean value of the respective positions of the thematic parts of all of said plurality of sound source data files.

15. The apparatus as defined in claim 13, wherein said representative value comprises a starting point of a sampling time, and wherein the control unit sets the representative value such that, when the plurality of sound source data files are each sampled starting at the default start position, resulting samplings comprise the thematic parts of a majority of said sound source data files.

* * * * *